United States Patent

Mattern

[15] 3,635,665
[45] Jan. 18, 1972

[54] PROCESS FOR THE RECOVERY OF MAGNESIUM OXIDE AND SULFUR DIOXIDE

[72] Inventor: Konrad Mattern, Bad Homburg, Germany
[73] Assignee: Metallgesellschaft Aktiengesellschaft, Frankfurt (Main), Germany
[22] Filed: Aug. 21, 1969
[21] Appl. No.: 852,027

[30] Foreign Application Priority Data

Aug. 22, 1968 Germany .................. P 17 94 009.9

[52] U.S. Cl. ........................... 23/129, 23/2 R, 23/130, 23/132, 23/177, 23/201
[51] Int. Cl. ................ C01f 5/42, C01f 5/02, C01b 17/48
[58] Field of Search ............... 23/129, 130, 132, 201, 177

[56] References Cited

UNITED STATES PATENTS

| 690,503 | 1/1902 | Wing ................................ 23/129 |
| 1,954,279 | 4/1934 | Bacon et al. ................. 23/129 X |
| 3,131,212 | 4/1964 | Biller ................................. 23/1 X |
| 3,273,961 | 9/1966 | Rogers et al. ................ 23/130 X |
| 3,438,722 | 4/1969 | Heredy et al. ............... 23/129 X |
| 3,505,008 | 4/1970 | Frerel et al. ................. 23/129 X |

FOREIGN PATENTS OR APPLICATIONS 382,502  3/1963  Japan ........................... 23/129

OTHER PUBLICATIONS

"Chemical Engineers' Handbook" by John H. Perry, Third Ed., 1950, page 1036. McGraw-Hill Book Co., Inc., New York.

*Primary Examiner*—Edward Stern
*Attorney*—Karl F. Ross

[57] ABSTRACT

A method of recovering MgO and $SO_2$ from the flue gases of a combustion process and for producing a digestion liquor for use in a pulp plant wherein the gases containing MgO and $SO_2$ are passed upwardly through outwardly dispersed atomized sprays of liquid. The liquid droplets are collected outwardly of the atomizing disks and passed to successively lower atomizing units where the process is repeated. Water introduced above the lower (wet precipitator) set of atomizing disks strips the MgO fly ash from the gas to form a suspension which is used in the upper stages to react with $SO_2$ (absorption stage) and produce the digestion liquor.

1 Claims, 4 Drawing Figures

PATENTED JAN 18 1972

Konrad Mattern
*Inventor.*

By Karl F. Ross
*Attorney*

PROCESS FOR THE RECOVERY OF MAGNESIUM OXIDE AND SULFUR DIOXIDE

My present invention relates to a process for the recovery of magnesium oxide (MgO) and sulfur dioxide ($SO_2$) from waste gases and especially flue gases of industrial processes.

In the manufacture of paper and, frequently, in the production of cellulosic materials in which a digestion solution or liquor is used to treat the pulp, use is made of acidic or neutral solutions buffered by MgO as a base. The MgO is generally recovered as a residue from the combustion of the concentrated solids from the waste liquor; a suspension thereof is then brought into intimate contact with flue gases from such combustion so that the $SO_2$ in the flue gases is also taken up. For this purpose, it has been proposed to use so-called "-packed tower" washers, venturi washers and the like to provide the desired intimate contact.

Packed towers, i.e., towers in which the gases usually pass upwardly countercurrent to the descending liquid stream across a mass of packing bodies such as Raschig rings, are characterized by relatively high pressure losses in the form of pressure drops between the gas inlet and gas outlet sides (e.g. on the order of 300 mm. $H_2O$). The high pressure drop in the gas displacement through the tower together with the requirement of repeated recirculation, in order to insure a proper distribution of the liquid across the packing bodies, entails a very high power consumption, e.g., of about 950 kw. Similarly, the power requirements for venturi washers are approximately 850 kw.

It is the principal object of the present invention to provide a system for recovering MgO and $SO_2$ from a flue gas in which power consumption is reduced and gas pressure loss is lowered.

Another object of this invention is to provide a method of abstracting MgO and $SO_2$ from waste gases of the character described, especially for the preparation of the digestion or treating liquors of pulp digestion processes, in which improved contact between the liquid and gas phases is effected and more complete economical removal of these components can be obtained.

These objects and others which will become apparent hereinafter are achieved, in accordance with the present invention, by a method of recovering MgO and $SO_2$ from flue gases of industrial processes containing these components which involves passing the gas (in which particles of MgO are entrained as fly ash and also containing $SO_2$) upwardly into intimate contact with an atomized liquid curtain formed by centrifugally directing or casting a liquid stream from a rapidly rotating disk or a plurality of axially spaced atomizing disks so that the droplets of liquid in which the $SO_2$ is dissolved and the MgO is trapped are collected in troughs radially outwardly from the atomizing disk and may be passed downwardly to contact further atomizing disks to increase the efficiency of MgO and $SO_2$ pickup.

According to an important feature of this invention, the liquid, generally a suspension of MgO formed in a wet precipitator lower stage in which $SO_2$ is dissolved in an $SO_2$ absorber upper stage, is atomized as it is thrown centrifugally outwardly against the walls of a vertical tube through which the gas passes upwardly. The troughs can then be provided along the cylindrical tube wall for collecting the liquid droplets enriched with MgO and $SO_2$. Surprisingly, for a given takeup of MgO and $SO_2$, by comparison with packed columns and venturi washers, the pressure drop of the gas is about 10 mm. $H_2O$ while the power consumption is about 80 kw.

It appears that the highly economical contact between the liquid and the gas phase is a consequence of the degree to which the liquid is finely divided by the rotating atomizing disks and the uniformity of the cloud or spray of liquid thereby produced. It will be recognized that most prior art systems for liquid/gas contact require manifold reversals of the flow direction of the liquid, such direction reversals being eliminated or made unnecessary in the system of the present invention.

It will be understood that the column according to the present invention may provide annular gaps between each of the atomizing disks and the respective wall portion through which the gas passes and preferably provides the troughs as radially inwardly extending members having upwardly reaching flanges which themselves are spaced radially outwardly of the atomizing disks.

I may provide ducts or the like to contact each trough with the successively lower atomizing disk, the latter having an axial inlet adjacent its drive shaft and radially outwardly open portions along its periphery to cast the liquid outwardly open portions along its periphery to cast the liquid outwardly while imparting an angular component or twist to the centrifugally dispersed atomized liquid. To this end, each disk may be provided with a plurality of blades or vanes preferably extending generally along a chord of the disk and curved along spiral arcs bulging in the direction of rotation of the disk. Between the vanes, the passages of the disk widen outwardly to the aforementioned openings.

According to another feature of this invention, a multiplicity of such disks are stacked one above the other on a common drive shaft extending along the axis of the column while means are provided below the column for collecting the suspension and recycling the same to an upper stage of the column. In addition, inlets and outlets may be provided along the column as required for introducing fresh liquid or removing the suspension at the desired degree of concentration of MgO and $SO_2$ or after the desired degree of removal of these compounds.

Thus the present invention provides a process for the recovery of MgO and $SO_2$ from a flue gas containing MgO fly ash and $SO_2$ which involves casting generally outwardly in substantially a horizontal plane at least one curtain of finely divided atomized liquid, passing the flue gas upwardly through this curtain and in intimate contact with the liquid thereof to entrain at least some MgO fly ash with the liquid, and collecting, outwardly of the curtain, liquid droplets containing MgO in the form of a suspension thereof. The liquid of said first curtain has a temperature at least equal to the dewpoint of the flue gas. The suspension may be cast centrifugally outwardly in the form of a further atomized curtain, so that passing the flue gas after its traversal of the first-mentioned curtain through the curtain of said suspension reacts the $SO_2$ of the flue gas with the MgO in said suspension; the liquor thus produced is collected outwardly of the second curtain. Preferably, the liquid of the first curtain has a temperature at least equal to the dewpoint of the flue gas.

The curtains are each produced by at least one rotating disk spun about a vertical axis and liquid is fed to each of said disks substantially at the center thereof and is accelerated outwardly by scoop-shaped vanes carried by each disk, the liquid being fed to each of the disks at a velocity corresponding substantially to the radial speed of said scoop-shaped vanes proximal to the center of the respective disk.

A plurality of such disks in axially spaced relationship and mounted upon a common shaft constitute a wet precipitator for removal of MgO and form a multiplicity of said first curtains, the flue gas being passed in succession upwardly through the first curtains with the suspension collected from an upper one of said first curtains being fed to the next lower disk of the wet precipitator. Also a plurality of such disks in axially spaced relationship on a common shaft constitute an $SO_2$ absorber forming a plurality of the second curtains, the flue gas being passed in succession upwardly through said second curtains, the liquor collected from one of the second curtains being fed to an adjoining disk of the $SO_2$ absorber; the disks of the wet precipitator and the disks of the $SO_2$ absorber are preferably provided upon a common shaft.

The above and other objects, features and advantages of the present invention will become more readily apparent from the following description, reference being made to the accompanying drawing in which.

Figure 1:
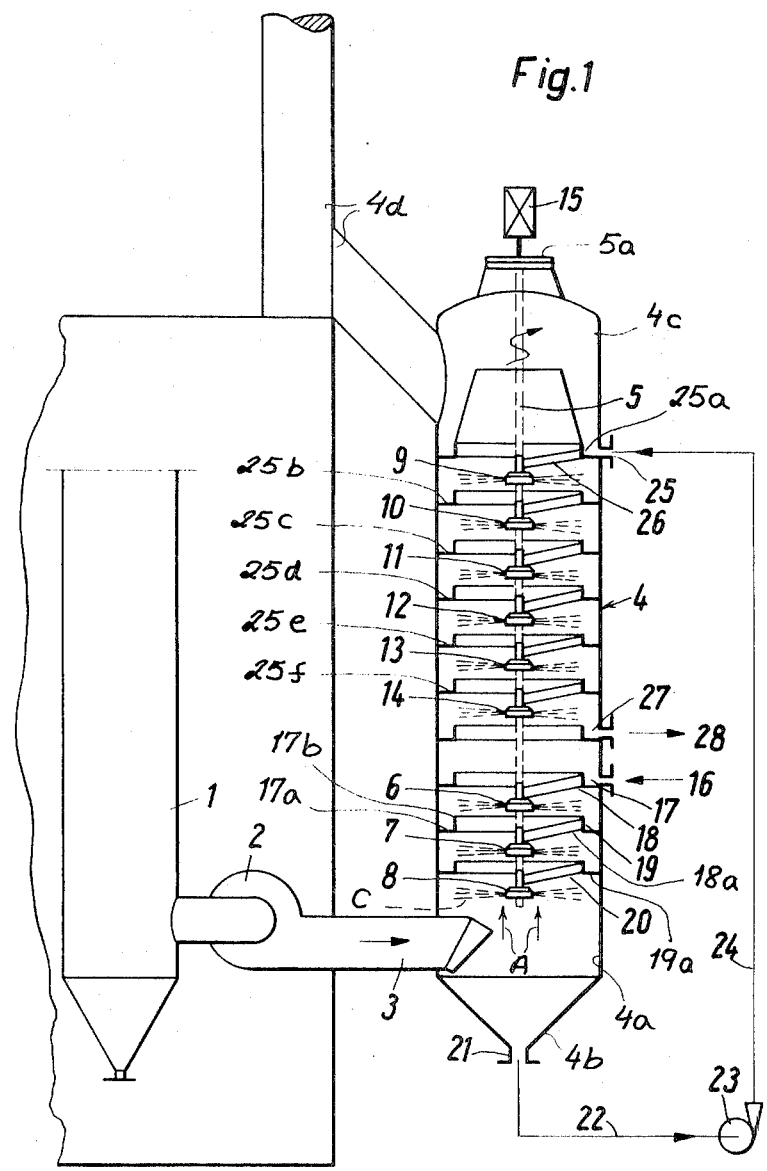
FIG. 1 is a diagrammatic vertical section through an apparatus for recovering MgO and $SO_2$ from flue gas streams according to this invention.
Figure 3:
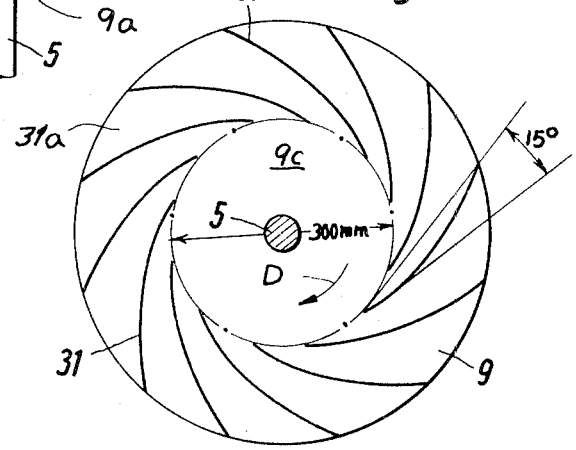
FIG. 3 is a horizontal section of the disk.

In FIGS. 1 and 3, I show a vapor kettle 1 from which the waste gases of a combustion process as previously described contact the flue gas containing MgO fly ash and $SO_2$, this apparatus being connected by a blower 2 and a duct 3 with the base of a liquid/gas-containing tower 4. The latter has a cylindrical inner chamber 4a in which the gas rises (arrow A) through successive contacting stages.

In the tower, there is provided along its axis a common rotating shaft 5, mounted in bearings 5a, carrying a succession of atomizing disks 6–14. The shaft 5 is driven by a motor 15 with a speed of, for example, 1,000 r.p.m. Outwardly of the atomizing disks 6–14, there are provided annular collecting troughs 17, 19 etc., each of which is formed with a horizontal floor 17a and an upwardly extending flange 17b serving to receive droplets of liquid cast against the wall 4a surrounding each of the atomizing disks.

The liquids fed to the center of each atomizing disk at the radial speed of the blades thereof at the center, are cast outwardly with radial acceleration to several times that velocity in the form of a relatively wide curtain uniformly distributed over the entire cross section of the tower and against the inner wall thereof.

The liquid is carried from each upper trough to the disk of the next lower stage by generally radial ducts 18 which may also be of trough-shaped configuration and will be referred to hereinafter as radial troughs. The fresh liquid can be introduced to the tower above the three lowermost stages (wet precipitator) at a radial inlet 16 to contact fresh flue gases rising from below these stages. The liquid is then fed substantially directly to the uppermost disk 6 of the lower section of the column where it is sprayed outwardly to contact rising gases partially stripped of the MgO and $SO_2$ by the two lowermost stages 7 and 8. From disk 6, the curtain contacts the walls of the column and is collected in the trough 19 surrounding the disk and located axially therebelow above the disk 7 to which the suspension is delivered by the radial trough 18a. Again, the liquid (now in the form of a suspension in which $SO_2$ is soluble) is cast outwardly in an atomizing curtain against the wall of column 4 for collection in the succeeding trough 19a from which it is delivered by the radial trough 20 to the final disk 8 of this portion of the column. The curtain C of this disk is the first contacted by the rising stream of gases and the droplets contacting the wall cascade to the collecting funnel 4b at the base of the column. From the latter, which is provided with an outlet 21, the MgO-containing suspension is led via a duct 22 to a circulating pump 23 which displaces the liquor via a line 24 to an inlet 25 above the upper stage of the tower. In the upper stage of the tower, absorption of $SO_2$ predominates while at the lower stage wet precipitation of MgO is dominant.

The liquor passes via the radial trough 26 from the uppermost annular trough 25a, into which the liquor is introduced, to the uppermost atomizing disk 9 from which a horizontal curtain is uniformly cast against the wall 4a of the column. Each stage 9, 10, 11, 12 and 13 is provided with an annular upwardly open trough 25b–25f of the construction previously described which is connected with the next lower atomizing disk by a radial trough so that the liquor is gradually enriched in $SO_2$ as it meets successively lower portions of the rising gas stream. Below the final disk 14, there is provided a collecting trough 27 from which the digestion liquor is removed as represented at 28 in the form of a so-called crude acid. Preferably the flow of gases through the system is so adjusted that substantially all of the MgO is removed upon passage through the curtains of liquid produced by the atomizing disks 6–8 whereas substantially all of the $SO_2$ is recovered by chemical combination with MgO upon passage of the gases through the curtains produced by the disks 9–14. The residual gas leaves the head 4c of the tower through a chimney 4d.

Figure 2:
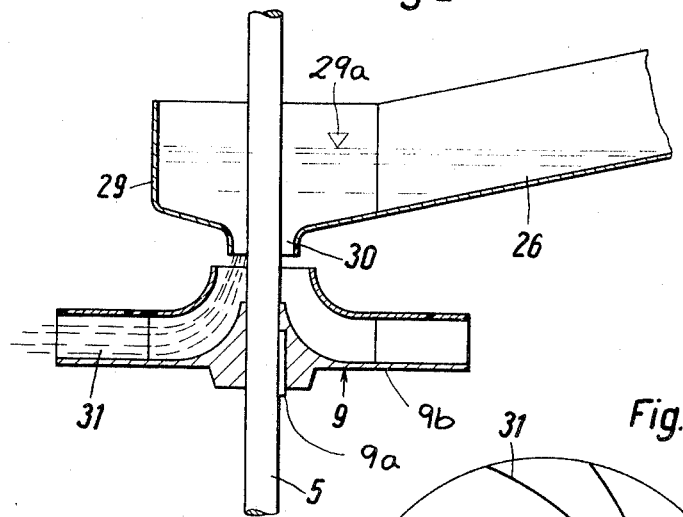
FIG. 2 is an axial cross-sectional detail view, drawn to an enlarged scale, of the means for transferring the liquid from one of the collecting troughs to the atomizing disk of a next lower stage.

In FIG. 2, I show a system for feeding the liquid from each overlying trough to the next underlying atomizing disk, the disk (for example the disk 9) being keyed at 9a to the shaft 5 and having a circular blade 9b upon which a multiplicity of upstanding vanes 31 are fixed, thereby defining between them outwardly widening channels 31a of arcuate configuration. The vanes 31 lie generally along chords of the disk but are curved in a spiral configuration so as to be convex in the direction of rotation of the disk 9 represented by the arrow D. The center of the centrifugal atomizing disk 9 is represented at 9c as free of the vanes and is axially aligned with the central opening 30 of an annular vessel 29 in which a float arrangement 29a maintains a height of about 300 mm. so that the liquid flows through the outlet 30 at a rate of 2.4 m./sec. onto the disk 9, i.e., at about the radial velocity of the blade.

As indicated in FIG. 3, the vanes or blades 31 may have an inner blade diameter of 300 mm. and a horizontal pitch angle of about 15° as measured between the chord spanned by each vane and the tangent to its inner end. These dimensions insure an unobstructed flow of the atomized liquid into and from the blades and channels and an acceleration to an exit speed of about 16 m./sec. in the radial direction. The vessel 29 is connected by the radial troughs 26 with the annular troughs 25, 25b etc.

Figure 4:
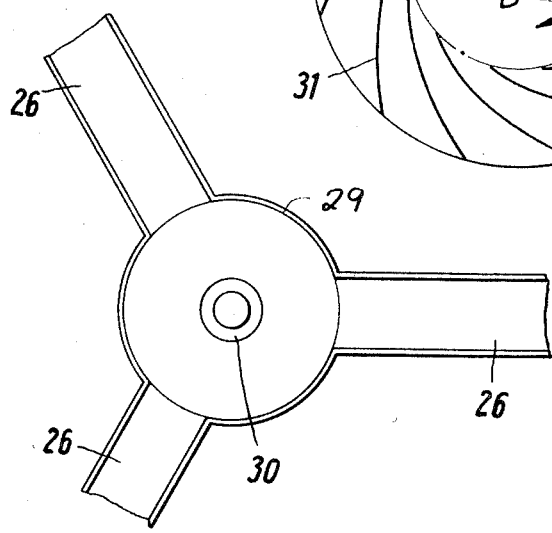
FIG. 4 is a plan view of the feed vessel for one of the disks and the ducts connecting same with the next higher trough.

In FIG. 4, I show three such radial troughs 26 connected with a common vessel 29 in angularly equispaced relationship, i.e., with a peripheral separation of about 120°.

EXAMPLE

The liquid/gas-contacting tower has three stages in its wet precipitation section and six stages in its upper $SO_2$ absorber section and is fed with flue gas from the combustion furnace of a pulp-treating plant, the gas containing MgO fly ash and $SO_2$. Tap water is introduced between the two stages and is passed from the uppermost disk 6 to the lowermost disk 8, then collected and pumped to the top of the second stage where it is atomized in the first level of the latter column. The total energy supplied for operating the column is about 80 kw. and the speed of shaft 5 is about 1,000 r.p.m. The liquid is fed to each atomizing disk with a height of about 300 mm. at a rate of 2.4 m./sec. and each atomizing disk has 12 blades of arcuate configuration as shown in FIG. 3 and described above. The liquid cast outwardly by each of the atomizing disks at a velocity of 16 mm./sec. is atomized and contacts the gas in fine droplets. The gas recovered at the top of the column is substantially free from MgO and $SO_2$.

I claim:

1. A process for the recovery of MgO and $SO_2$ from a flue gas containing MgO fly ash and $SO_2$, comprising the steps of:
    casting generally outwardly in substantially a horizontal plane a first curtain of finely divided atomized liquid of a temperature at least equal to the dewpoint of the flue gas;
    passing said flue gas upwardly through said first curtain and in intimate contact with the liquid thereof to entrain at least some MgO fly ash with said liquid;
    collecting outwardly of said curtain liquid droplets containing MgO in the form of a suspension thereof;
    casting said suspension centrifugally outwardly in the form of a second curtain of finely divided atomized suspension;
    passing the flue gas after its traversal of the first-mentioned curtain through said second curtain of said finely divided atomized suspension to react $SO_2$ of the flue gas with the MgO in said suspension; and
    collecting the liquor thus produced outwardly of the second curtain.

* * * * *